United States Patent
Bramel et al.

(10) Patent No.: US 7,071,589 B2
(45) Date of Patent: Jul. 4, 2006

(54) METHOD AND SYSTEM FOR REDUCING BEARING FLUTING IN ELECTROMECHANICAL MACHINE

(75) Inventors: Rodney Bramel, Bothell, WA (US); Robert Silbernagel, Seattle, WA (US)

(73) Assignee: Precor Incorporated, Woodinville, WA (US)

( * ) Notice: Subject to any disclaimer, the term of this patent is extended or adjusted under 35 U.S.C. 154(b) by 176 days.

(21) Appl. No.: 10/176,250

(22) Filed: Jun. 19, 2002

(65) Prior Publication Data

US 2003/0086630 A1 May 8, 2003

Related U.S. Application Data

(63) Continuation-in-part of application No. 10/011,823, filed on Nov. 6, 2001, now abandoned.

(51) Int. Cl.
H02K 5/16 (2006.01)
(52) U.S. Cl. .............. 310/90; 482/51; 198/952
(58) Field of Classification Search ................. 310/90, 310/91, 43, 67 R, 54, 52, 47, 50, 254, 258, 310/259, 64, 51; 482/51; 198/952
See application file for complete search history.

(56) References Cited

U.S. PATENT DOCUMENTS

| | | | |
|---|---|---|---|
| 2,957,562 A | 10/1960 | Rudisch | |
| 3,873,886 A | 3/1975 | Kato et al. | |
| 4,196,805 A | 4/1980 | Banno | |
| 4,268,758 A | 5/1981 | Grassmann | |
| 4,434,448 A * | 2/1984 | Bell et al. | 361/23 |
| 4,511,837 A * | 4/1985 | Vermeiren et al. | 324/671 |
| 4,604,665 A * | 8/1986 | Muller et al. | 360/97.02 |
| 4,801,252 A * | 1/1989 | Wrobel | 417/354 |
| 4,952,830 A * | 8/1990 | Shirakawa | 310/68 B |
| 5,313,129 A | 5/1994 | Stewart | |
| 5,325,005 A * | 6/1994 | Denk | 310/68 B |
| 5,357,160 A * | 10/1994 | Kaneda et al. | 310/67 R |
| 5,442,506 A | 8/1995 | Kang | |
| 5,594,606 A * | 1/1997 | Hans et al. | 360/99.08 |
| 5,650,678 A * | 7/1997 | Yokozawa et al. | 310/90 |
| 5,773,906 A * | 6/1998 | Mukai et al. | 310/232 |
| 5,914,547 A | 6/1999 | Barahia et al. | |

(Continued)

FOREIGN PATENT DOCUMENTS

DE 3741678 A1 6/1989

(Continued)

OTHER PUBLICATIONS

The Boyanton Paper: "Bearing Damage Due to Electrical Discharge" by Hugh Boyanton, Vice President of Shaft Grounding Systems, Inc. (Printed from http://www.teleport.com/~sgsi/paper1.html (26 pp.).

(Continued)

*Primary Examiner*—Darren Schuberg
*Assistant Examiner*—Heba Elkassabgi

(57) ABSTRACT

A non-conductive insulating ring (210) is inserted between a motor bell (130) and a motor bearing (135) that supports a motor shaft (110). Stray currents that normally discharge thorough the motor shaft and the motor bearing to the motor bell are prevented due to the non-conductive nature of the insulating ring. Additionally, the motor shaft is grounded to provide a low-impedance alternative path to stray shaft currents. When a fast-switching frequency converter is used to drive the motor shaft, additional arrangements such as a common mode choke, reduction of the switching frequency of the converter, and reduction of the turn-of/off rate of a semiconductor device used in the converter, may be provided to further reduce the stray currents flowing thorough the motor bearings.

16 Claims, 4 Drawing Sheets

U.S. PATENT DOCUMENTS

| | | | |
|---|---|---|---|
| 5,941,547 A * | 8/1999 | Drake | 280/243 |
| 5,961,222 A * | 10/1999 | Yabe et al. | 384/476 |
| 5,969,450 A * | 10/1999 | Satterfield et al. | 310/90 |
| 5,977,675 A * | 11/1999 | Oelsch | 310/90 |
| 5,988,996 A * | 11/1999 | Brookbank et al. | 417/423.3 |
| 6,030,128 A | 2/2000 | Pontzer | |
| 6,091,173 A * | 7/2000 | Byrd | 310/85 |
| 6,147,423 A * | 11/2000 | Byrd | 310/89 |
| 6,208,098 B1 * | 3/2001 | Kume et al. | 318/254 |
| 6,478,720 B1 * | 11/2002 | Barker | 482/54 |
| 6,572,513 B1 * | 6/2003 | Whan-Tong et al. | 482/54 |
| 6,608,410 B1 * | 8/2003 | Sato et al. | 310/67 R |
| 6,670,733 B1 * | 12/2003 | Melfi | 310/68 R |

FOREIGN PATENT DOCUMENTS

| | | |
|---|---|---|
| DE | 101 61 820 A1 | 9/2002 |
| EP | 0 403 924 A2 | 12/1990 |
| EP | 0 403 924 A3 | 12/1990 |
| FR | 1.217.229 | 5/1960 |

OTHER PUBLICATIONS

Busse, D. et al.; (Allen Bradley Drives Division, Mequon, WI); "Bearing Currents and Their Relationship to PWM Drives," IEEE IECON Conference, Orlando, FL Nov. 1995.

* cited by examiner

METHOD AND SYSTEM FOR REDUCING BEARING FLUTING IN ELECTROMECHANICAL MACHINE

CROSS-REFERENCE TO RELATED APPLICATION

This is a continuation-in-part of Ser. No. 10/011,823, filed on Nov. 6, 2001 now abandoned.

FIELD OF THE INVENTION

This invention relates generally to the field of electromechanical machines that have a rotating shaft, such as electric motors, and more specifically to a combination of arrangements used to reduce stray currents travelling through the motor bearings, thereby preventing fluting or other damage.

BACKGROUND OF THE INVENTION

Generally speaking, electromechanical machines are used in many applications where it is necessary to convert electrical energy to rotational mechanical energy. The speed of the rotation is governed by the parameters of the electromechanical machine. Parameters governing the speed include whether the machine is AC or DC, the voltage level of the input, the design of the machine itself, and the frequency of the input voltage. The last of these parameters, the frequency of the input voltage, can be varied to control the speed of the machine to a high degree of accuracy.

These variable speed electromechanical drive systems are used in numerous industries, including manufacturing, transportation, and power generation. Recent innovations in high power semi-conductor technologies have led to an exponential growth of the applications of variable speed electromechanical drive systems. With the of variable speed drives, however, new problems have arisen due to the fast switching speeds of the power electronics of the drive system.

One such problem is the fluting of motor bearings caused by stray currents generated in the field of the motor that are not properly insulated from the shaft of the electromechanical machine. Fluting is a type of electrical discharge machining, which results in a corrugated pattern often found on the surface of the inner or outer race of a bearing. This type of damage reduces the life of bearings that should last from six to ten years to as little as four months. It is estimated that millions of dollars are lost to this type of bearing damage because of the increased maintenance necessary when damaged shafts and other components must be replaced.

The present invention is directed to a method and arrangement that are designed to reduce the stray currents passing through motor bearings to thereby minimize the damage caused by the problem of fluting.

SUMMARY OF THE INVENTION

The present invention seeks to remedy the problem described above and to provide an improved electromechanical machine. A typical electromechanical machine comprises a housing structure that supports a shaft along a predetermined central axis. The machine includes a stator fixed with respect to the housing structure and having a plurality of conductive windings radially spaced about the central axis. A rotor fixed with respect to the shaft is located radially inward of the stator. The rotor has a plurality of current paths radially spaced about the central axis. The housing structure maintains at least one bearing assembly to rotatably support the shaft. Typically, an electromechanical machine will have two bearing assemblies rotatably connected to the shaft on either end of the machine. The bearing assemblies are housed within an end motor bell that is connected to either end of the machine housing.

When dealing with electromechanical machines, invariably, stray current generated in the field of the electromechanical machine will produce a succinct shaft voltage. High shaft voltages produce damaging currents that are between the components of the motor bearings when the voltage reaches a critical level. The bearing grease resident between the bearings and the shaft acts as a weak dielectric which leads to damaging currents. The damaging current leads to localized patterns of elevated on the bearings, which in turn cause a discontinuity in the physical characteristics of the bearing. This damage increases the number of times the bearings need to be replaced, and subsequently, the cost of motor maintenance.

The present invention consists of a novel combination of arrangements that are each designed to reduce the amount of stray currents passing through motor bearings or, more specifically, the current density of such currents. The combination generally includes two to five arrangements. First, an insulating ring of non-conductive material may be mounted in a motor bell to serve as both a support for the motor bearing and a barrier insulating the motor shaft and the motor bearing from the motor bell. The insulating ring reduces the chance of possible bearing failure caused by current passing through the motor bearings to the rotating shaft and vice versa. Alternatively, the insulating ring can be injection molded directly into the motor bell eliminating the need to machine the motor bell and press fit the insulating ring in the motor bell. Second, the motor shaft may be grounded so as to provide a low-impedance path alternative to the path extending through the motor bearings. Third, when an electromechanical machine (e.g., a motor) is driven by a fast-switching converter with a common mode voltage, a common mode choke may be used. Fourth, also when a fast-switching converter is used, the switching frequency of the converter may be reduced. Fifth, still further when a fast-switching converter is used, the turn-on/off rate of a power-switching semiconductor device used in the converter, such as an insulated gate bi-polar transistor (IGBT), may be slowed. Third, fourth, and fifth arrangements are designed to generally reduce the generation of high-frequency stray currents, which are considered to be the primary source of currents through the motor bearings.

The present invention is particularly useful with electric motors used for powering exercise treadmills. The speed of such motors is varied frequently during a running session either manually by the user or automatically in preprogrammed running courses.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

This invention relates generally to the field of electromechanical machines that have a rotating shaft, such as electric motors, and more specifically to a combination of various arrangements that are designed to prevent fluting or other damage as a result of stray currents travelling through motor bearings.

Figure 1:
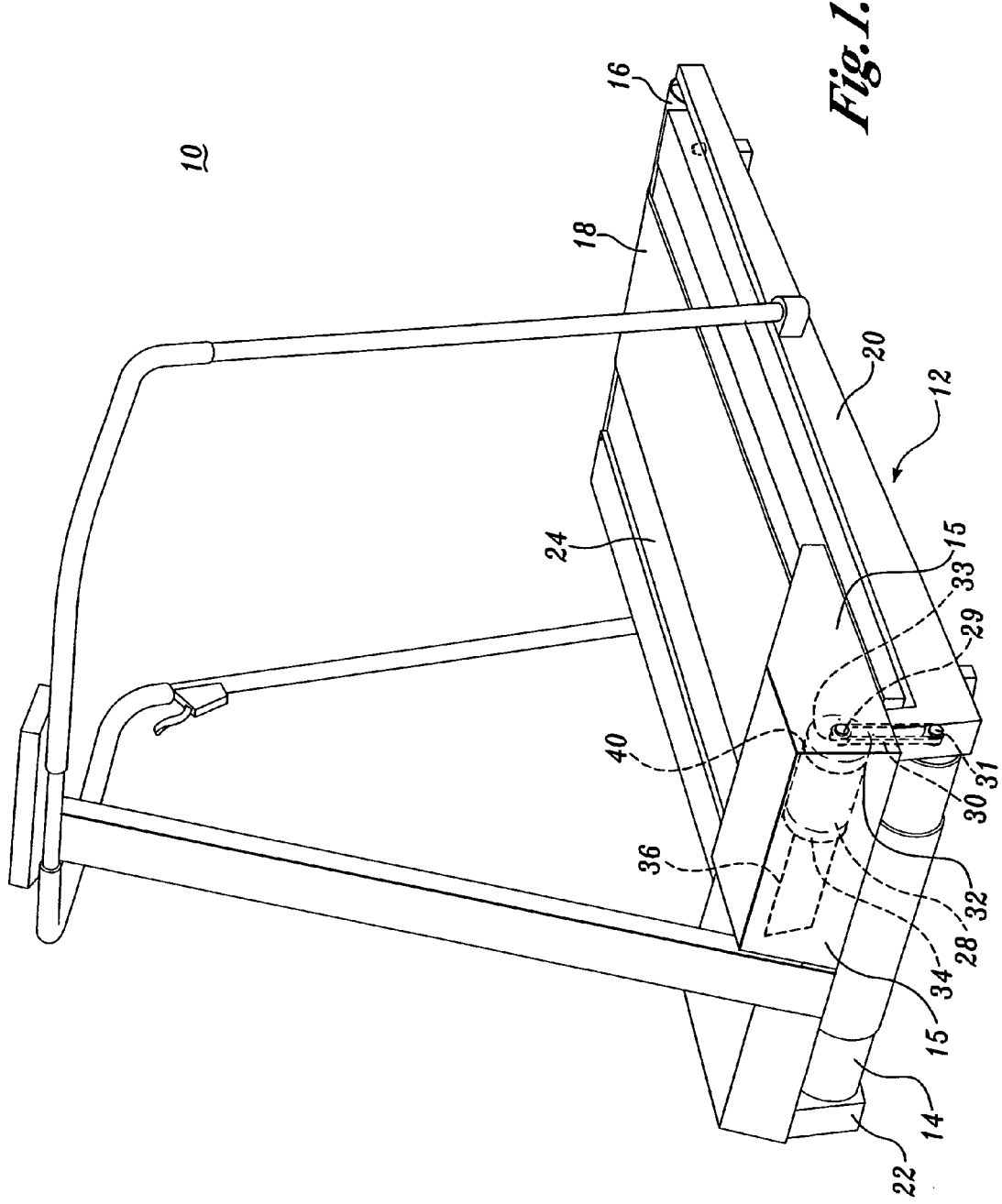
FIG. 1 is a pictorial view of a treadmill constructed in accordance with the present invention.

Electric motors that benefit greatly from the present invention are those used in exercise treadmills. FIG. 1 illustrates a typical exercise treadmill 10, which includes a longitudinal frame 12, on the opposite ends of which are transversely mounted a forward roller assembly 14 and a rear roller assembly 16. An endless belt 18 is trained about the forward roller assembly 14 and rear roller assembly 16. The treadmill frame includes first and second longitudinal rail members 20 and 22. The longitudinal rail members are spaced apart and joined by cross members (not shown), as is well known in the field of treadmill frame construction. A relatively rigid deck 24 spans between and is supported between the first and second longitudinal rail members 20 and 22.

The upper run of the belt 18 is supported by the deck 24. The treadmill 10 further includes a drive motor 28 having a drive shaft 29. A driven pulley 31 is mounted on the adjacent end of the forward roller assembly 14, as is conventional in treadmills. The driven pulley 31 engages the drive belt 30 which in turn engages the drive pulley 33 attached to the drive shaft 29.

Figure 2:
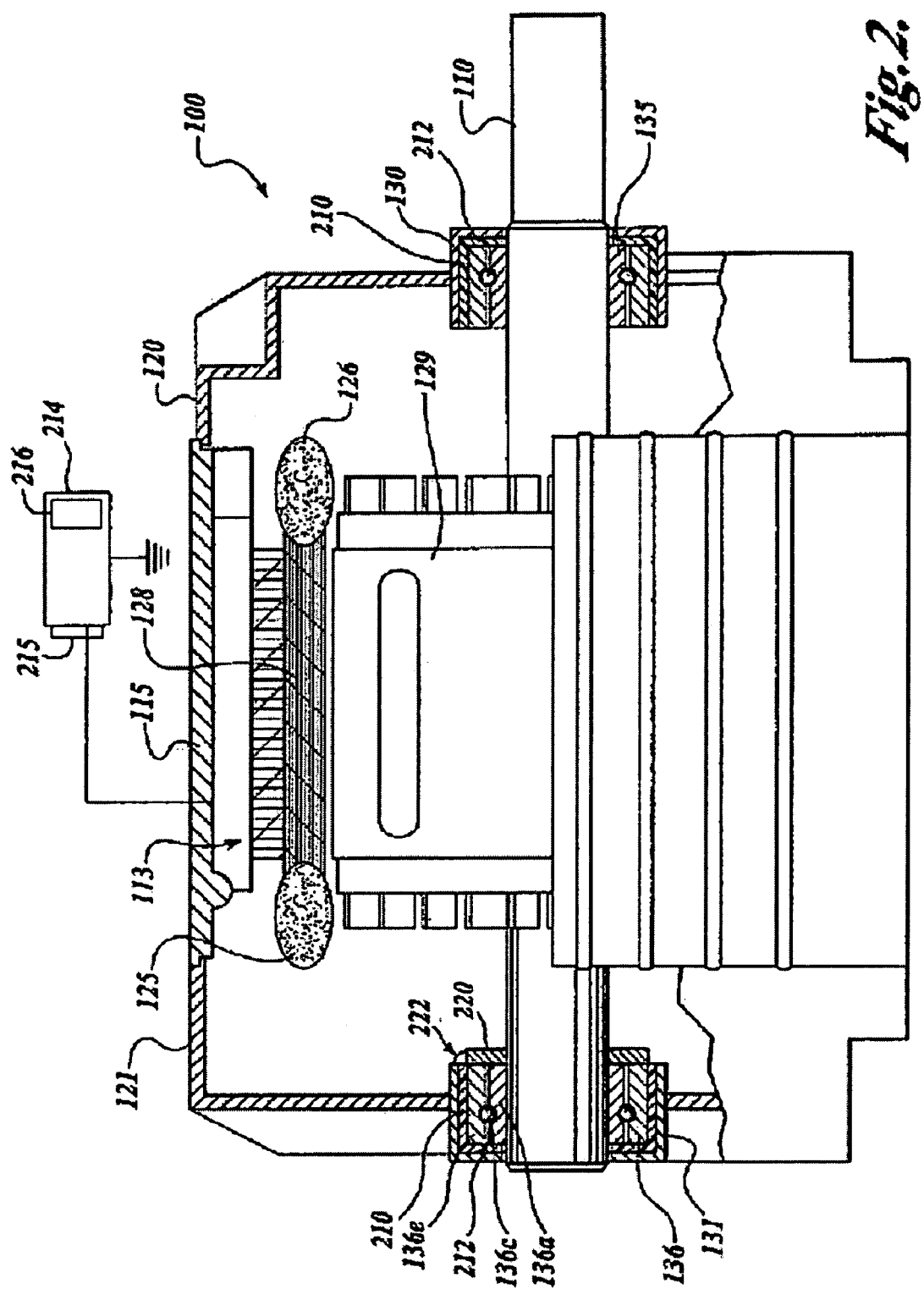
FIG. 2 is a schematic cutaway view of an electromechanical machine showing the machine housing partially cut away to reveal various internal components.

FIG. 2 shows an electromechanical machine 100 having a rotating shaft 110 that is a suitable embodiment wherein the present invention may be practiced. The electromechanical machine 100 may correspond to the drive motor 28 shown in FIG. 1. The internal parts of the machine are enclosed in a structure formed by a main housing 115 and two end bells 120 and 121. Each end bell includes an endwall that houses respective motor bells 130 and 131, in substantial alignment with shaft 110. The motor bells 130 and 131 support motor bearings 135 and 136, respectively, to which the shaft 110 is journaled to help facilitate the antifriction rotation of the shaft 110.

The electromechanical machine includes a stator 113, located outward of and encircling the rotating shaft 110 inside the main housing 115 that remains fixed in place during operation. Cut-away views of the windings 128 of the stator 113 are depicted at 125 and 126. Inward of the stator 113 is a rotor 129 that is connected to the rotating shaft 110 to rotate therewith. During operation, when electric current is applied to the windings 128 of the stator 113, the electromagnetic force generated from the circular path causes the rotor 129 and shaft 110 to rotate, thus producing rotational energy to be used in many applications. Variations of this electromechanical machine including DC machines and synchronous AC machines are well known in the art and are not described in further detail here. The present invention is capable of operation on any electromechanical machine.

Before describing a suitable embodiment of the present invention, the problem associated with the electromechanical machine 100 will be described. When high voltage is applied to the electromechanical machine 100, a large quantity of current is generated in the windings 128 of the stator 113, which in turn produce the desired electromagnetic force to rotate the rotor 129 and shaft 110. Undesired electromagnetic forces are also created inside the electromechanical machine 100, which in turn cause undesired electric currents flow between various metal parts of the electromechanical machine 100. These undesired currents are typically dealt with by grounding the main housing 115, thus eliminating safety hazards of stray currents discharging to anything outside of the electromechanical machine 110. However, the stray currents can still cause damage to internal parts of the machine through continuous electrical discharge machining. Specifically, stray currents can flow from the rotating shaft 110 through the motor bearings 135 and 136 to the motor bells 130 and 131, and vice versa, before discharging to ground. When these currents become repetitive and more intense, the motor bearings 135 and 136 tend to develop localized patterns of damage where stray currents have arced and led to discontinuities in the physical characteristics of the bearings. This kind of damage is known as fluting. Fluting can significantly reduce the durability of the bearings 135 and 136 and, as a result, the bearings 135 and 136 must be replaced much more frequently. Stray currents are especially problematic in exercise treadmills when DC machines are frequently toggled for faster and slower speeds. The sudden change in excitation voltage to the DC machine can result in a high concentration of stray current and eventually damage to the motor bearings.

Figure 3:
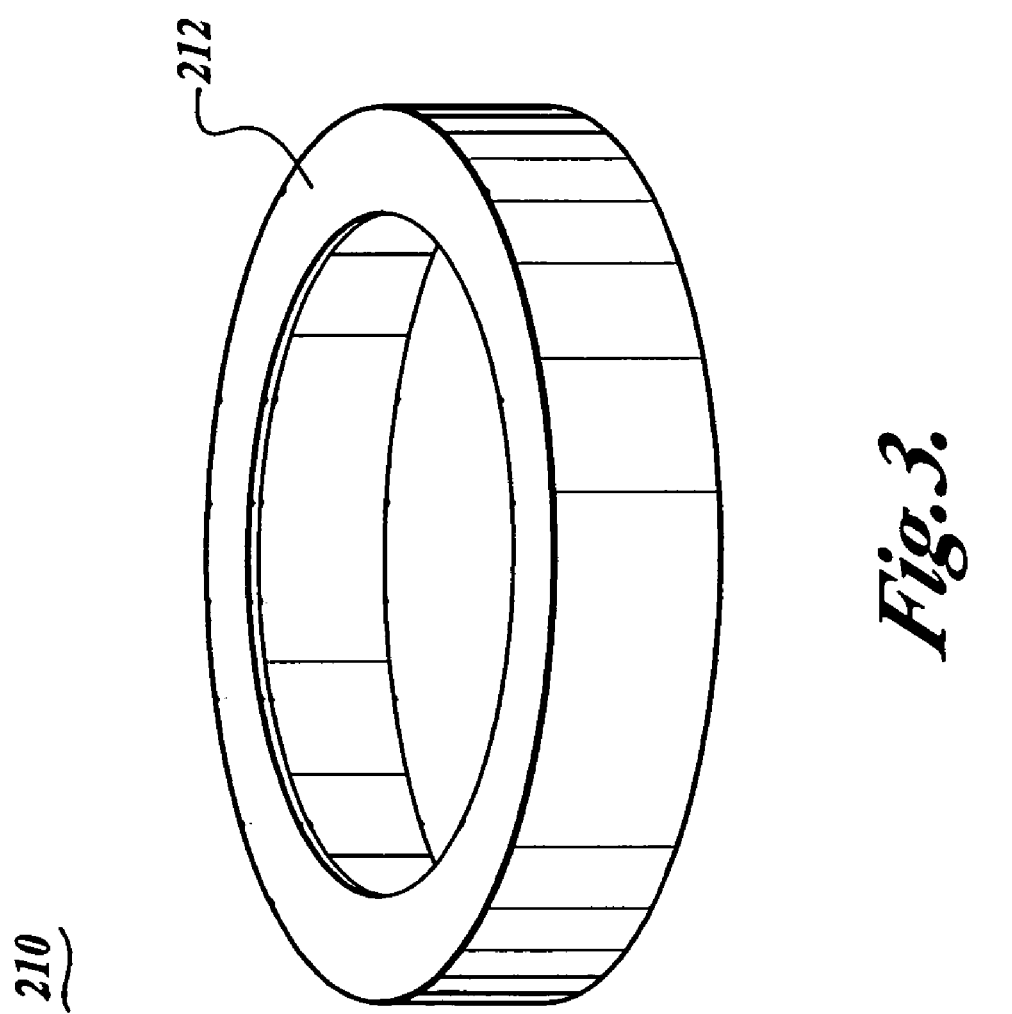
FIG. 3 depicts an isometric view of an insulating ring in accordance with aspects of the present invention.

Referring also to FIG. 3, an isometric view of an insulating ring 210 is illustrated in accordance with aspects of the present invention. The insulating ring 210 is designed to interrupt the stray current path discussed above that causes fluting. One end of the insulating ring 210 is in the form of an inwardly directed transverse flange or face 212. As shown in FIG. 2, the ring 210 seats within the motor bells 130 and 131 so that the flange 212 separates the adjacent end of the bearings 135 and 136 from the respective motor bells 130 and 131 and so that the internal diameter of flange 212 closely encircles shaft 110, thereby isolating the shaft 110 and the bearings 135 and 136 from the motor bells 130 and 131.

The insulating rings 210 are configured to receive and to serve as a seat for the roller bearings 135 and 136. As such, the internal diameter of the insulating rings 210 closely matches the outside diameter of the roller bearings 135 and 136.

The insulating ring 210 can be made of a wide variety of plastic materials that do not conduct electricity (for example, a fiberglass-filled plastic sold under the brand name "Ryton"), fiberglass, ceramics, or any other suitable nonconductive substance capable of being machined to snugly fit inside a seat formed in the motor bells 130 and 131 of the electromechanical machine 100 and to receive the roller bearings 135 and 136. One skilled in the art will appreciate that the material must also be of a suitable hardness and durability to seat the bearings 135 and 136 and sustain forces associated with the high levels of rotations per minute of the bearings. By inserting an insulating ring 210 into the cavity of a motor bell 130 and 131 such that no part of the motor bell 130 and 131 comes into direct contact with the rotating shaft 110, the stray current path described previously is interrupted.

FIG. 2 shows the insulating rings 210 fitted inside motor bells 130 and 131. The insulating ring 210 is machined to a suitable shape, dimension, specification and tolerance to fit securely inside of the motor bells and carry the bearings 135 and 136 such the motor bells and the shaft 110 of the electromechanical machine 100 do not come into direct contact with each other.

Alternatively, the insulating ring 210 can be injection molded directly into the motor bells such that the motor bells and the shaft 110 do not come into direct contact with each other. In this procedure the motor bell itself serves as a portion of the "mold." After the injection molding procedure, the motor bell, with the insulating ring in situ, can be machined for proper fit with the motor bearings.

While the use of the insulating ring 210 serves to increase the impedance of current paths through the bearings 135 and 136, the operation of the electromechanical machine 100 invariably produces some level of shaft voltage which, when increased beyond a threshold level, could still cause currents to flow through the shaft 110 to other adjacent elements including the bearings 135 and 136. Therefore, in accordance with the present invention, the shaft 110 may be grounded so as to provide the path of least resistance (e.g., 8 ohms) to any currents generated within the shaft 110 due to shaft voltage. The shaft grounding may be accomplished in various ways as will be apparent to those skilled in the art. In one embodiment, referring to FIG. 2, the shaft 110 is connected to ground via a ring-shaped brush 220 made of, for example, copper, a brush wire 222, and the motor housing 115. The brush wire 222 may take various forms, for example, a spring that is configured and arranged to spring-loadedly secure the brush 220 within the motor bell 130 or 131.

Figure 4:
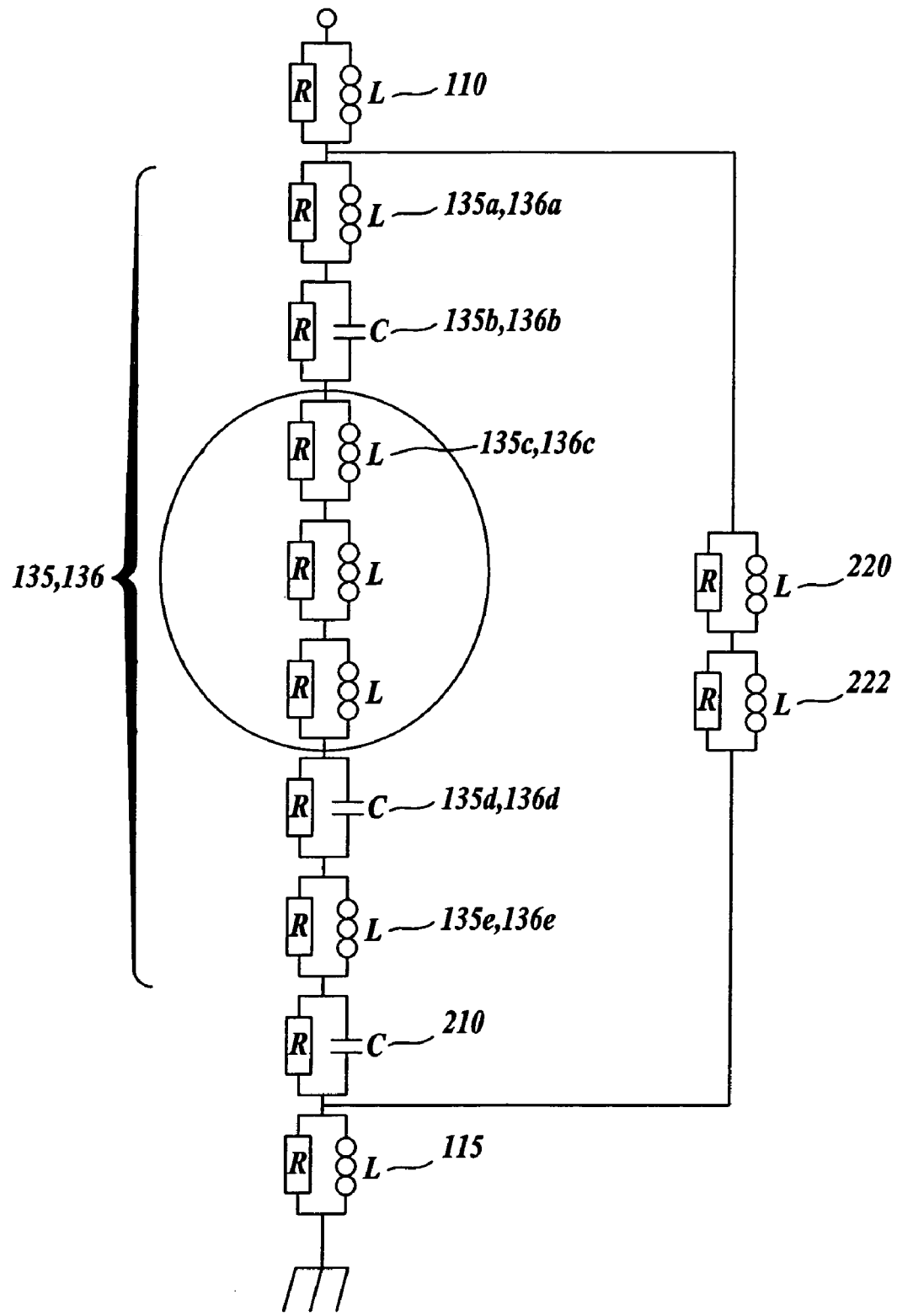
FIG. 4 is a diagram showing an electrical equivalent of the electrical path from the motor shaft to ground as shown in FIG. 2.

FIG. 4 is a schematic diagram showing electrical equivalents of electrical pathways from the shaft 110 through the bearings 135 and 136 and the insulating ring 210 to the motor housing 115 and then to ground, as shown in FIG. 2, consisting of a combination of inductances, impedances, and capacitances. More specifically, referring additionally to FIG. 2, FIG. 4 illustrates the path from the motor shaft 110 to an inner race 135A or 136A of the corresponding bearing, a lubricant film (weak dielectric) 135B or 136B of the corresponding bearing, rolling elements 135C or 136C of the corresponding bearing, yet another lubricant film 135D or 136D of the corresponding bearing, an outer race 135E or 136E of the corresponding bearing, the insulating ring 210, the motor housing 115, and to ground. FIG. 4 also shows that the shaft 110 is grounded via the brush 220 and the brush wire 222, in accordance with the present invention. As will be apparent from FIG. 4, the insulating ring 210 increases the impedance of the path through the bearings 135 and 136, while the grounded shaft 110 provides a low impedance path around the bearings 135 and 136 to ground. Therefore, these two features, when used in combination, sufficiently reduce the currents through the motor bearings 135 and 136 to prevent electrical discharge machining of the bearings. For example, it is known in the industry that current densities should be maintained at less than about 0.8 ampere-peak/mm$^2$ (when a frequency-switching converter, such as a PWM drive, is used to drive a motor, as more fully described below) in order to adequately prevent substantial electrical discharge machining of motor bearings. Application of the grounded shaft 110 alone will not be able to achieve such a low level of current density at the bearings because the resistance of the brush 220 and brush wire 222 is typically higher than the impedance through the bearings 135 and 136 if no insulating ring 210 is used.

As briefly discussed above, the fluting problem is particularly significant when a variable speed drive (VSD) is used to drive an electromechanical machine (e.g., a motor). A VSD consists of a fast-switching frequency converter, such as a pulse width modulated (PWM) drive. A PWM drive includes power-switching semiconductor devices such as insulated gate bi-polar transistors (IGBTs) and gate turn-off transistor (GTOs), which are used to create a pulse-width modulated output voltage wave form.

The inventors of the present application have identified that there are generally three types of unwanted currents that are generated when an electromechanical machine is driven by a fast-switching frequency converter 214 (FIG. 2), such as a PWM drive: high-frequency shaft-grounding currents; high-frequency circulating currents; and capacitive discharge currents.

High-frequency shaft-grounding currents are caused by the common mode voltage generated at the output of the converter 214. More specifically, when the sum of the two voltages of the common mode voltage output is not equal to zero, a protective earth voltage having a high frequency is produced. If the impedance of a return path of the converter is too high, and if the grounding of the stator 113 of the electromechanical machine 100 is poor, this voltage will cause a high-frequency current to flow from the stator 113, through the bearings 135 and 136, to the shaft 110 and then to ground (assuming the shaft 110 is grounded).

High-frequency circulating currents are also caused by the common mode voltage at the converter output when the sum of the two voltages is not equal to zero. The common mode voltage causes a common mode disturbance, which produces a current asymmetry between the three phases in the windings of the stator 113. As a consequence, the sum of the currents over the stator's circumference becomes not zero. In such a case, a high-frequency flux variation surrounds the shaft 110, creating a high-frequency shaft voltage. This voltage results in high-frequency circulating currents flowing axially along the rotor 129, through one of the bearings 135 or 136 and the housing 115, then through the other bearing 136 or 135. Thus, high-frequency circulating currents always have a different sign at each of the two bearings 135 and 136.

Lastly, capacitive discharge currents are created when the bearings' lubricant film functioning as a capacitor experiences a breakdown voltage. In a rolling bearing that is working well, the rolling elements in the bearing are separated from the outer and inner races of the bearing by a lubricant film. A lubricant film normally acts as a dielectric, which is charged by the rotor voltage. However, when the voltage's frequency becomes sufficiently high, a lubricant film forms a capacitor, the capacitance of which depends on various parameters such as the type of lubricant, temperature and viscosity of the lubricant, and the lubricant film thickness. When the voltage reaches a certain breakdown or threshold level, the capacitor is discharged and high-frequency capacitive discharge currents are generated. In this case, the amount of discharge currents is limited by the internal stray capacitances of the electromechanical machine 100, but the currents will occur every time the converter switches. Thus, it is believed that the use of fast-switching semiconductor devices, such as IGBTs, to form a frequency converter, such as a PWM drive, contributes significantly to the generation of the capacitive discharge currents. Furthermore, IGBTs used in a PWM drive cause a very rapid voltage rise (dv/dt) up to 5–8 or even 10 kV/µs at the converter output, which also contributes to the generation of the capacity of discharge currents.

In summary, it is understood that the fluting problem is caused, at least in part, by the common mode voltage not equaling zero at the output of a converter driving an electromechanical machine. It is further understood that the fluting problem is caused by high-frequency (5 kHz–10 MHz) currents flowing through the motor bearings, which are induced by the electromagnetic interference caused by the use of a fast-switching frequency converter, such as a PWM drive, including fast-switching (e.g., switching per 100 ns) semiconductor devices, such as IGBTs. Based on these understandings, according to the present invention, three additional arrangements are proposed, each being designed to mitigate the fluting problem by reducing the generation of high-frequency currents: using a common mode chock (FIG. 2); reducing the switching frequency of a converter drive; and slowing the firing rate of a semiconductor device 216 used in the converter.

A common mode choke 215, as well understood in the art, is arranged between the converter output and the electromechanical machine 100 to present high impedance to common mode currents, i.e. high-frequency currents induced by the use of a converter having a common mode voltage. Thus, the use of a common mode choke 215 serves to minimize the amount of high-frequency shaft-grounding currents and high-frequency circulating currents, as described above.

Reducing the switching frequency of a converter is intended to reduce not only the high-frequency currents generated due to the common mode voltage at the converter output, but also the discharge currents from the bearings' lubricant acting as a capacitor. For example, a typical switching frequency of 3–12 kHz used in a PWM drive, depending on the power range, can be reduced to at or below about 10 kHz. This method is effective in reducing all of the high-frequency shaft-grounding currents, high-frequency circulating currents, and capacitive discharge currents.

Reducing the firing rate of a semiconductor device 216 used in a converter, for example, slowing the IGBT turn-on/off rate, is also intended to reduce both the high-frequency currents generated due to the common mode voltage at the converter output, and the discharge currents from the bearings' lubricant acting as a capacitor. For example, the normal turn-on/off rate of switching per 100 ns, which is set without regard to the fluting problem resulting therefrom, can be reduced by up to 50%. This arrangement is effective for reducing all of the high-frequency shaft-grounding currents, high-frequency circulating currents, and capacitive discharge currents.

The five arrangements hereinabove discussed may be combined, in part or in all, to optimally reduce the fluting problem in an electromechanical machine. The combination of: an insulated ring 210 (increasing the impedance through the bearings 135 and 136); a grounded shaft 110 (providing a low-impedance alternative path to the path through the bearings); and a common mode choke 215 reduced switching frequency in a converter 214, and a slower IGBT turn-on/off rate (reducing stray high-frequency currents, generated due to the use of a fast-switching converter with a common mode voltage) is designed to reduce stray currents or, more specifically, the current density thereof, at the bearings 135 and 136. As discussed above, the current density of at or below 0.8 ampere-peak/mm.sup.2 is considered to be adequate to prevent significant fluting problem. Using various combinations of these five arrangements in accordance with the present invention, a desirable level of the current density at the motor bearings can be achieved to reduce the fluting problem, depending on each application.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An electromechanical machine having an output shaft supported by bearings seated in motor bells, an improvement comprising:
    an insulating ring of non-conductive material shaped to be mounted in the motor bell of the electromechanical machine and to serve as a seat for the output shaft bearing thereby to electrically isolate the output shaft and the bearing from the motor bell; and
    a conductive element coupled to the output shaft for grounding the output shaft, wherein the electromechanical machine is driven by a fast-switching converter including a power-switching semiconductor device, and the turn-on/off rate of the semiconductor device is slowed to reduce the fluting of the bearings from the normal turn-on/off rate that is set without considering the reduction of the fluting.

2. The improvement of claim 1, wherein the turn-on/off rate of the semiconductor device is slowed by approximately 50% from its normal rate.

3. The improvement of claim 1, wherein the switching frequency of the converter is reduced to minimize the fluting of the bearings from the normal switching frequency that is set without considering the minimizing of the fluting.

4. The improvement of claim 3, wherein the switching frequency of the converter is reduced to the level of approximately 10 kHz.

5. An exercise treadmill comprising:
    a frame;
    a forward roller assembly mounted on the frame to rotate about a forward transverse axis;
    a rear roller assembly mounted on the frame to rotate about a rear transverse axis;
    an endless belt trained about the forward and rear roller assemblies; and
    an electric motor having an output shaft drivingly coupled to one of the forward and rear roller assemblies, said electric motor comprising motor bells in electrical contact with a motor stator, and insulating rings interposed between the motor bells and antifriction bearings for supporting the output shaft, the insulating rings functioning as seats for the antifriction bearings, and the output shaft being grounded, wherein the electric motor is driven by a fast-switching converter including a power-switching semiconductor device, and the turn-on/off rate of the semiconductor device is slowed to reduce the fluting of the antifriction bearings from the normal turn-on/off rate that is set without considering the reduction of the fluting.

6. The exercise treadmill of claim 5, wherein the turn-on/off rate of the semiconductor device is slowed by approximately 50% from its normal rate.

7. The exercise treadmill of claim 5, wherein the switching frequency of the converter is reduced to minimize the fluting of the antifriction bearings from the normal switching frequency that is set without considering the minimizing of the fluting.

8. The exercise treadmill of claim 7, wherein the switching frequency of the converter is reduced to the level of approximately 10 kHz.

9. The electromechanical machine of claim 8, wherein the turn-on/off rate of the semiconductor device is slowed by approximately 50% from its normal rate.

10. An electromechanical machine having an output shaft supported by bearings seated in motor bells, the electromechanical machine being driven by a fast-switching converter including a power-switching semiconductor device, wherein the turn-on/off rate of the semiconductor device is slowed to reduce the fluting of the bearings from the normal turn-on/off rate that is set without considering the minimizing of the fluting.

11. An electromechanical machine having an output shaft supported by bearings seated in motor bells, the electromechanical machine being driven by a fast-switching converter, wherein the switching frequency of the converter is reduced to minimize the fluting of the bearings from the normal switching frequency that is set without considering the minimizing of the fluting.

12. The electromechanical machine of claim 11, wherein the switching frequency of the converter is reduced to the level of approximately 10 kHz.

13. An electromechanical machine having an output shaft supported by bearings seated in motor bells, an improvement comprising:
   an insulating ring of non-conductive material shaped to be mounted in the motor bell of the electromechanical machine and to serve as a seat for the output shaft bearing thereby to electrically isolate the output shaft and the bearing from the motor bell; and
   the electromechanical machine being driven by a fast-switching converter including a power-switching semiconductor device, and the turn-on/off rate of the semiconductor device is slowed to reduce the fluting of the bearings from the normal turn-on/off rate that is set without considering the minimizing of the fluting.

14. The electromechanical machine of claim 13, wherein the turn-on/off rate of the semiconductor device is slowed by approximately 50% from its normal rate.

15. An electromechanical machine having an output shaft supported by bearings seated in motor bells, an improvement comprising:
   an insulating ring of non-conductive material shaped to be mounted in the motor bell of the electromechanical machine and to serve as a seat for the output shaft bearing thereby to electrically isolate the output shaft and the bearing from the motor bell; and
   the electromechanical machine being driven by a fast-switching converter, the switching frequency of the converter being reduced to minimize the fluting of the bearings from the normal switching frequency that is set without considering the minimizing of the fluting.

16. The electromechanical machine of claim 15, wherein the switching frequency of the converter is reduced to the level of approximately 10 kHz.

* * * * *